(12) United States Patent
Chaohai et al.

(10) Patent No.: US 7,492,071 B2
(45) Date of Patent: Feb. 17, 2009

(54) WATER-RESISTANT ELECTRIC MOTOR

(76) Inventors: Wang Chaohai, 19-2 Renmin Xinjiayuan, Room 402, Changzhou City, JiangSu Province (CN); Jan Bos, 217 Xing Ming Street, Suzhou, JiangSu Province (CN) 215021; Danny R. Minor, 166 Riverview Dr., Decatur, AL (US) 35603

( * ) Notice: Subject to any disclaimer, the term of this patent is extended or adjusted under 35 U.S.C. 154(b) by 0 days.

(21) Appl. No.: 11/804,212

(22) Filed: May 17, 2007

(65) Prior Publication Data

US 2008/0284265 A1 Nov. 20, 2008

(51) Int. Cl.
*H02K 5/00* (2006.01)

(52) U.S. Cl. ....................................................... 310/89

(58) Field of Classification Search .................. 310/89, 310/88, 87, 71
See application file for complete search history.

(56) References Cited

U.S. PATENT DOCUMENTS

| | | | | |
|---|---|---|---|---|
| 3,081,411 A | * | 3/1963 | Wiley | 310/254 |
| 5,767,596 A | * | 6/1998 | Stark et al. | 310/89 |
| 5,872,414 A | * | 2/1999 | Iijima | 310/89 |
| 6,674,199 B2 | * | 1/2004 | Long | 310/89 |
| 2002/0117919 A1 | * | 8/2002 | Williams et al. | 310/89 |
| 2006/0261692 A1 | * | 11/2006 | Wong et al. | 310/89 |

* cited by examiner

*Primary Examiner*—Nguyen N Hanh
(74) *Attorney, Agent, or Firm*—George P. Kobler; Lanier Ford Shaver & Payne P.C.

(57) ABSTRACT

A water-resistant electric motor includes a housing for receiving an electric motor armature therein and an end cap for closing an open end of the housing. The housing includes a drive shaft aperture within a cylindrical recess that receives a journal bearing and a ring seal. The end cap includes a wire access hole for receiving power supply wires. Surrounding the wire access hole is a ridge with cut-outs. A wire cover plate is seated on top of the ridge and includes cut-outs that correspond to the cut-outs in the ridge so that the power supply wires are accommodated therein when the cover plate is secured to the ridge. The wire access hole includes a grommet to seal the hole.

12 Claims, 5 Drawing Sheets

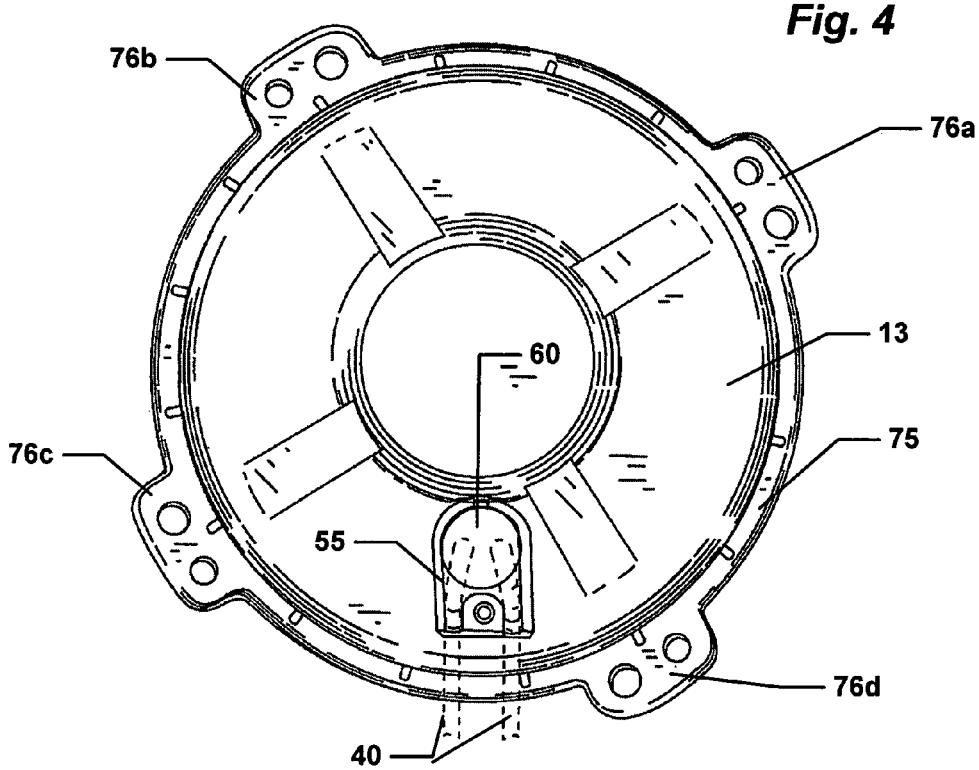
Fig. 4
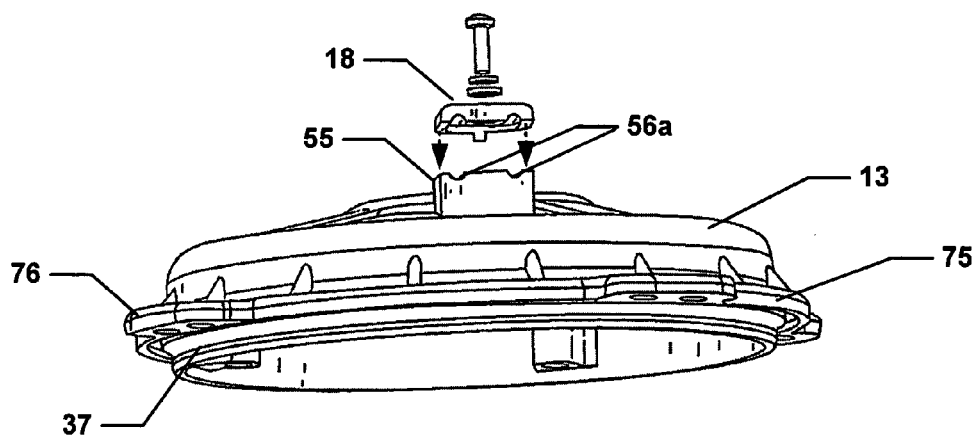
Fig. 5
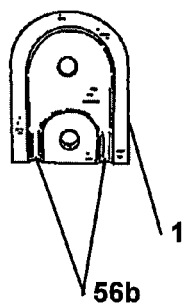
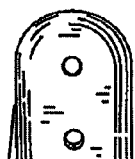
Fig. 6A   Fig. 6B

WATER-RESISTANT ELECTRIC MOTOR

BACKGROUND OF THE INVENTION

The present invention relates to a casing for an electric motor, and more particularly to an improved casing that reduces or eliminates the potential for water intrusion into the motor.

Many electric motors are subjected to conditions where water is present, either through splashing, raining or even being submerged. An example is an all-terrain vehicle ("ATV") that may be used to cross creeks or streams. In many cases, electric motors of the ATV will be under water. The potential for water intrusion is particularly high when a motor and housing with an elevated temperature is submerged in cold water. If water enters a motor casing, it can have devastating effects on the ability of the motor to operate properly. Thus, there is a need for an improved electric motor and housing to minimize the risk for water intrusion.

SUMMARY OF THE INVENTION

The present invention is directed to an improved electric motor and housing that reduces the potential for water intrusion. A water-resistant electric motor includes a housing for receiving an electric motor armature therein and an end cap for closing an open end of the housing. The housing includes a drive shaft aperture within a cylindrical recess that receives a journal bearing and a ring seal. The end cap includes a wire access hole for receiving power supply wires. Surrounding the wire access hole is a ridge with cut-outs. A wire cover plate is seated on top of the ridge and includes cut-outs that correspond to the cut-outs in the ridge so that the power supply wires are accommodated therein when the cover plate is secured to the ridge. The wire access hole includes a grommet to seal the hole.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

FIG. 4 is a top plan view of the top of the end cap of the casing;

FIG. 5 is a perspective view of the side of the end cap showing an exploded view of the wire cover plate assembly;

FIGS. 6A and B are the underside and the top of the wire cover plate;

DETAILED DESCRIPTION OF THE PREFERRED EMBODIMENTS

Figure 1:
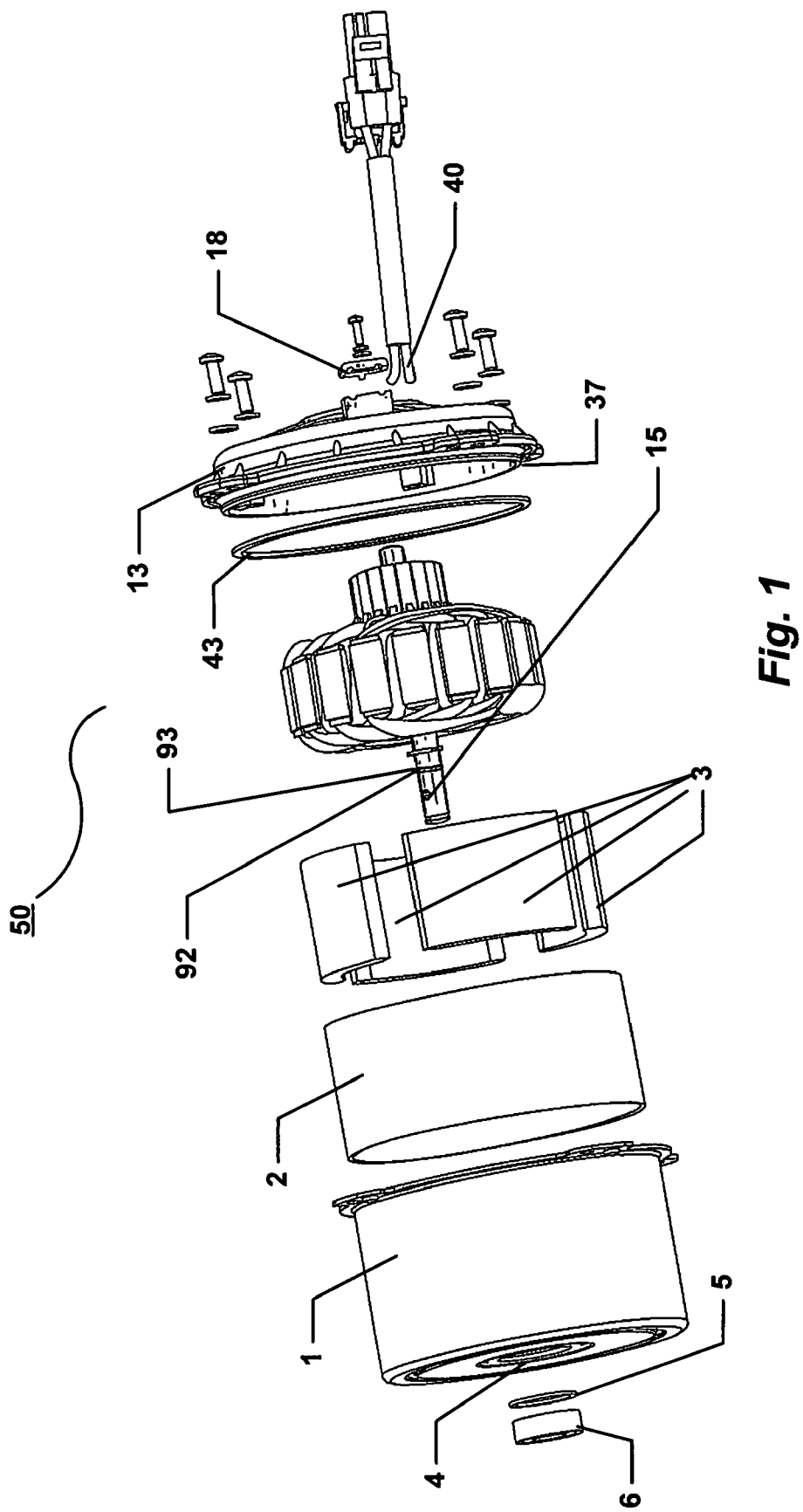
FIG. 1 is an exploded view of an electrical motor incorporating the features of one embodiment of the present invention.
Figure 2:
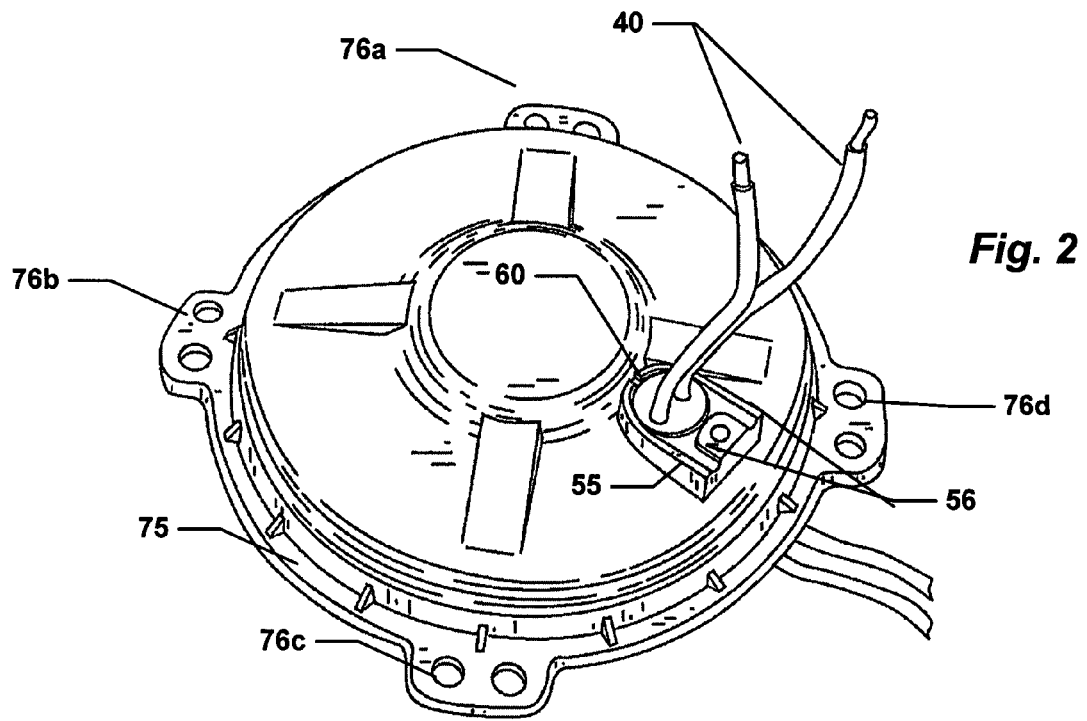
FIG. 2. is a top perspective view of the end cap of the casing according to an embodiment of the present invention.
Figure 3:
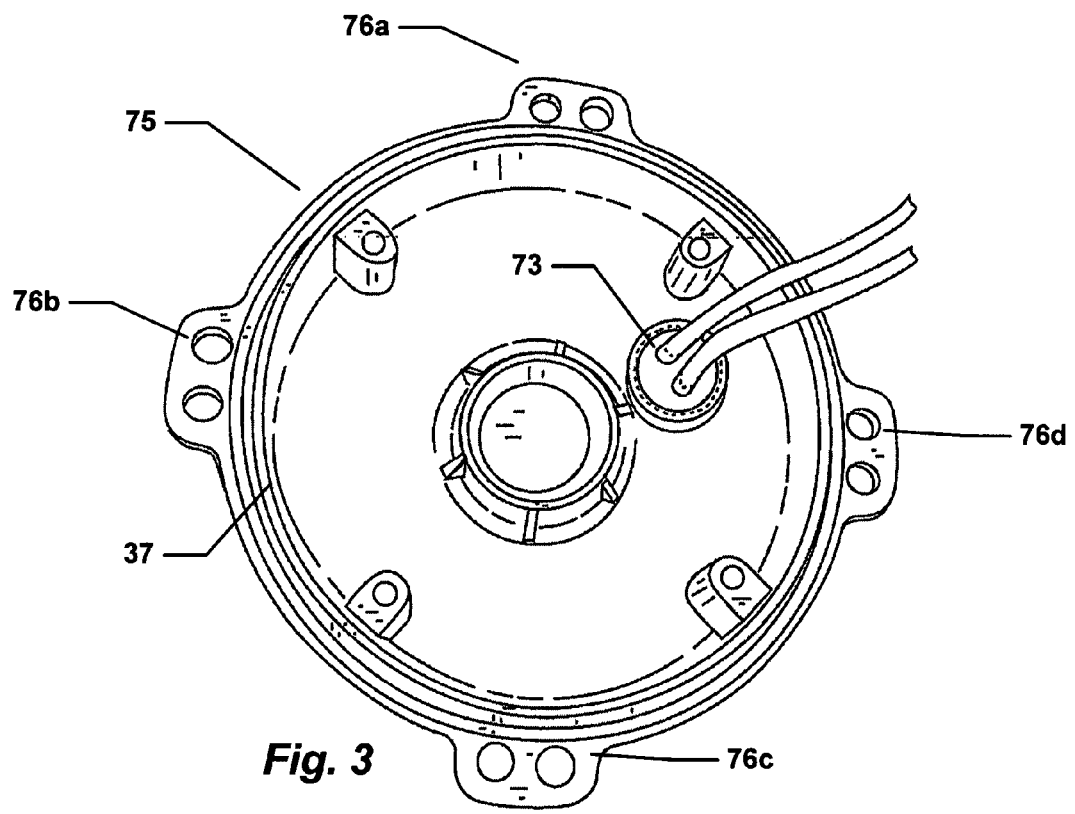
FIG. 3 is a perspective view of the underside of the end cap of the casing according to an embodiment of the present invention.
Figure 7:
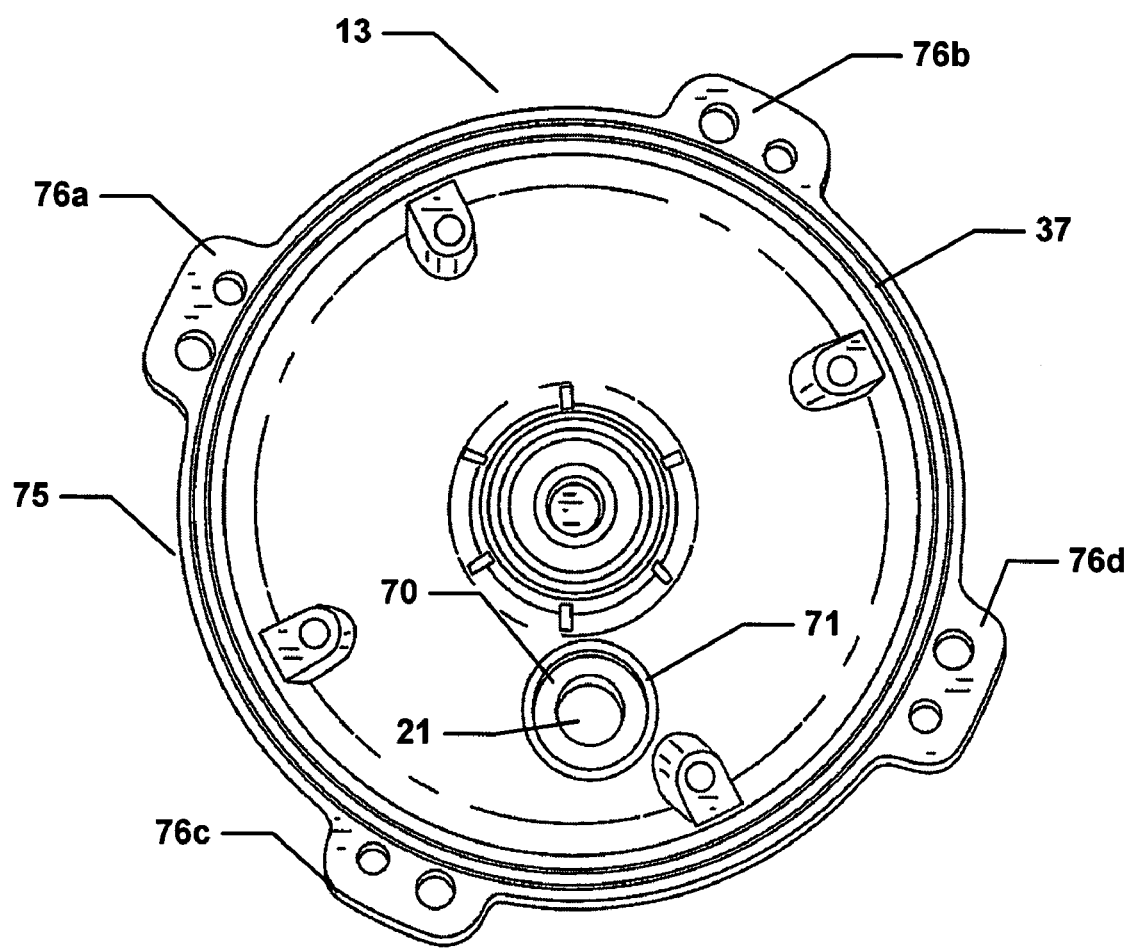
FIG. 7 is a plan view of the underside of the end cap.
Figure 8:
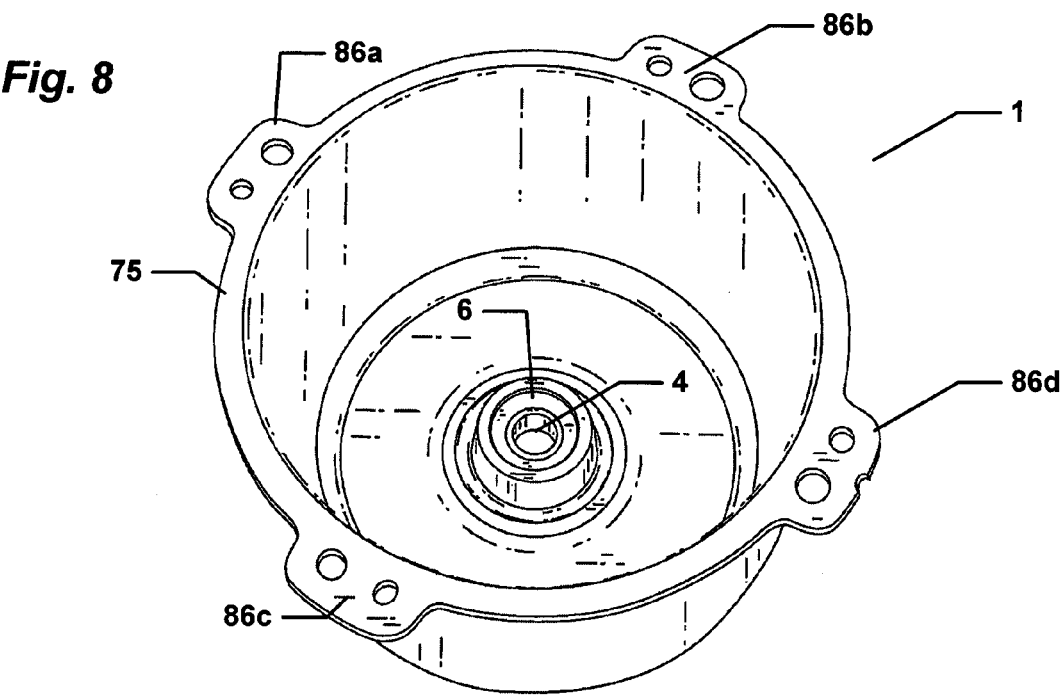
FIG. 8 is a perspective view of the interior of the housing.
Figure 9:
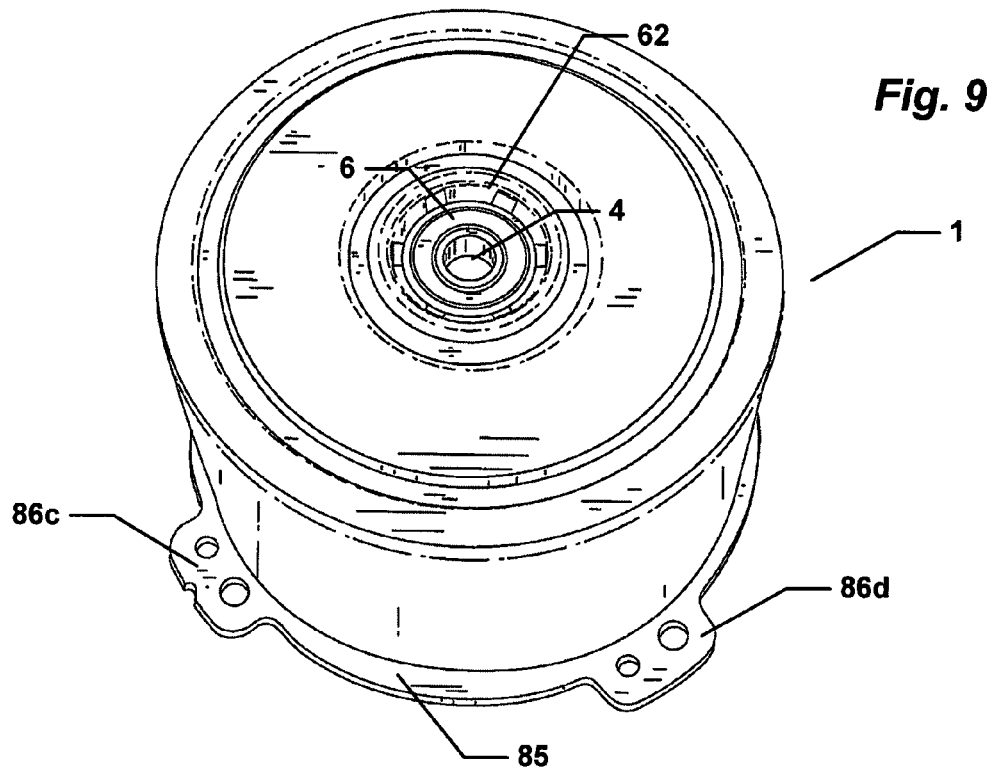
FIG. 9 is a perspective view of the exterior of the housing.

With reference to FIGS. 1 through 9 of the drawings, the motor 50 comprises a generally cylindrical housing 1 with an open end for receiving the motor components therein, and an end cap 13 dimensioned to fit the open end housing 1. The housing 1 opposing end is closed and includes an aperture 4 through which a drive shaft 15 extends. The end cap 13 is configured to have a wire access hole 21 to receive the wires 40 that supply current to the motor 50. On the outer side of the end cap 13, surrounding the wire access hole 21 is a ridge 55 with one or more recesses 56a in which the wires 40 rest. A wire cover plate 18 is dimensioned to fit snugly upon the ridge 55 and retains the wires 40 in place. Wire cover plate 18 may also be configured with one or more recesses 56b corresponding to the one or more recesses 56a of the ridge 55 for further securing of the wires 40.

In one embodiment, the wire cover plate 18 is generally unshaped, having an open end to receive the wires 40. In this embodiment the wires 40 (shown in dashed lines in FIG. 4) rest against the outer surface of the end cap 13 seated within recesses 56a, b and are secured by the wire cover plate 18 preferably with a fastener 57. The wires 40 pass through the hole in the end cap 13 and to the motor 50 to supply power.

In another embodiment a grommet 60 (FIGS. 2 & 3) is seated within the wire access hole 21 in the end cap 13. The grommet 60 includes holes through which the wires 40 pass, which are preferably sized to tightly accommodate the gauge of the wires 40. Grommet 60 may be of any resilient, pliable, compressible material including without limitation rubber, silicon, or a polymeric substance, and may be dimensioned to be slightly greater in circumference than wire access hole 21, such that the grommet 60 must be slightly compressed circumferentially to fit within the wire access hole 21 whereupon its resiliency causes it to expand to slightly beyond the circumference of the hole 21. In height, and the grommet 60 should preferably slightly extend beyond the upper limits of the ridge 55 surrounding wire access hole 21 without compression, when seated within the hole 21. Thus, in this embodiment, when the wire cover plate 18 is seated on the ridge 55 and secured in place to the end cap 13 with fastener 57, the grommet 60 is compressed forming a seal within wire access hole 21.

In a further embodiment, the end cap 13 inner surface is configured to have a ridge 71 surrounding the wire access hole 21 that forms a sealant reservoir 70 in which sealant 73 may be deposited. In this configuration, the sealant reservoir 70 provides a place to hold a sealant 73 to close off any remaining voids that may not have been adequately addressed by the wire cover plate mount 55 and grommet 60.

The end cap 13 and the housing 1 may also include corresponding annularly disposed flanges 75, 85, extending outwardly with respect to the interior of the end cap and housing. Each such annular includes a plurality of extensions 76a-d, corresponding to the extensions 86a-d on the opposing flange 75, 85. The extensions 76, 86 include one or more apertures that corresponding to one or more apertures within the extensions on the opposing flange for receiving fasteners for securing the end cap 13 to the housing 1. An O-ring 43 of suitably resilient, compressible, pliable material may be seated between the respective flanges 75, 85. Additionally, the end cap 13 may include an annular rim 37 providing a male extension extending longitudinally toward, and sized to be snugly received within the opening of the housing 1. The O-ring 43 is then seated along the outer periphery of the annular rim 37. It will be appreciated by those skilled in the arts that in the alternative the housing 1 could be configured with the annular rim to fit within the end cap 13.

It will also be appreciated that the housing 1 and end cap 13 could be secured in any of the known conventional means, including having the securing means (i.e., a bolt) screwed into threaded holes disposed on the interior of the housing opening. One drawback of this configuration is that it provides an additional point of potential water intrusion.

Drive shaft 15 extends through an aperture 4 in the housing 1 end, the drive shaft aperture 4 is positioned co-centric with the longitudinal axis of the housing and thus the motor and is surrounded by a generally cylindrical recess 62 that accommodates a journal bearing 6, which may be press fit into the recess and sized to tightly fit the drive shaft 15, and the recess 62. One embodiment also uses a ring seal 5 about the drive shaft 15 and located intermediate the journal bearing 6 the housing 1 within the recess 62. Ring seal 5 may have an outside diameter approximately coincident with the outside diameter of the journal bearing 6, to reduce or eliminate any water from entering the housing 1 even if water passes through the fit of the housing bearing 6. Again, ring seal is made from a suitable resilient, compressible material, for example, rubber, silicon or a pliable polymeric.

The housing 1 may be made in any of the known conventional means, including as a weldment of two or more pieces of rolled sheet metal attached together by a seam. Alternatively, the housing 1 is a one-piece seamless member, formed by casting or by stamping, thereby eliminating potential water intrusion along the seam. In such a case, the only three potential water intrusion points are thus around the drive shaft aperture, between the connection of the housing 1 to the end cap 13, and the wire access hole 21. This invention, configured as described above, therefore, reduces, or eliminates the risk of water entry in these areas.

Additional means to eliminate or reduce the possibility of water intrusion to sensitive parts of the motor are used along the drive shaft 15 inside the housing. The drive shaft 15 may be formed with one or more grooves 92 disposed circumferentially around the shaft 15 and configured to receive a shaft O-ring 93 and disposed along the shaft to abut the interior housing surface at the drive shaft opening 4 and sized to extend slightly beyond the inner diameter of the drive shaft aperture 4 through which the drive shaft 15 passes.

The housing 1 may be made of any conventional metal. Also, the housing 1 is configured to have a bush collar 2 corresponding to the inside diameter of the housing 1 and resting within the housing 1. The bush collar 2 acts as a flux insulator between the metal housing 1 and the magnets 3, maintaining an elevated degree of magnetic flux around the magnets. Alternatively, the housing 1 could have an integral flux insulating layer. The magnets 3 are located around the interior diameter of the bush collar 2 and are preferably secured in place by springs or clips, the springs or clips exerting a force urging the magnets 3 apart and against the inner wall of the collar 2 thus holding them apart by tension. Alternatively, the magnets 3 can be secured by means incorporated into the housing 1 (or bush collar 2 if used) or end cap 13, for example having perpendicular posts (not depicted) projecting from the internal face spaced around the periphery, and having grooves to receive the edges of the magnets. Alternatively, the magnets 3 can be affixed to the housing 1 (or bush collar 2) by an adhesive or by integral grooves or clips. Additional magnet supports (not depicted) allocated on the side of the housing 1 closer to the motor shaft 15 can be used to provide further means to keep the magnets secured.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

As described above and shown in the associated drawings, the present invention comprises a water-resistant electric motor. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

The invention claimed is:

1. A water-resistant electric motor having an armature for applying torque to a drive shaft, said motor comprising:
   a. a generally cylindrical housing for receiving the armature therein, said housing comprising:
      i. an open end with an annularly disposed flange extending outwardly therefrom, said flange having a first plurality of tabs having one or more apertures therein for receiving one or more fasteners; and
      ii. a closed end opposite said open end within which is a drive shaft aperture located co-centric with the longitudinal axis of said housing for receiving the drive shaft therethrough, and a generally cylindrical recess disposed co-centrically about said aperture and recessing toward the interior of said housing within which is seated a ring seal, said recess configured to receive a journal bearing mounted to the drive shaft; and
   b. an end cap for closing the open end of said housing, said end cap comprising:
      i. a second annularly disposed flange extending outwardly therefrom, said flange having a second plurality of tabs having one or more apertures for receiving one or more fasteners therein, said tabs corresponding to said one or more apertures in said first plurality of tabs;
      ii. a wire access hole through the end cap for receiving power supply conductors inserted therethrough;
      iii. a ridge extending from an outer surface of said end cap disposed about said wire access hole, and a wire cover plate dimensioned to overlay said ridge, said ridge having at least one cut-out corresponding to at least one cut-out in the edge of said wire cover plate, said cut-outs dimensioned such that the power supply conductors are retained therein when said wire cover plate overlays said ridge;
      iv. a second ridge extending interiorly from the inner surface of said end cap encircling said wire access hole to form a reservoir; and
      v. a grommet inserted into said wire access hole having apertures for snugly receiving the power supply conductors inserted therethrough.

2. The motor of claim 1, wherein said end cap further comprises an inner annular rim extending toward the interior of the motor dimensioned to be seated against the inner wall of said open end of said housing.

3. The motor of claim 2, further comprising an o-ring disposed about the outer periphery of said annular rim.

4. The motor of claim 3, wherein said end cap further comprises an inner annular rim extending toward the interior of the motor dimensioned to be seated against the inner wall of said open end of said housing.

5. The motor of claim 4, further comprising an o-ring disposed about the outer periphery of said annular rim.

6. The motor of claim 1, wherein the drive shaft includes a circumferential groove for receiving a ring seal located along the shaft at the point where the shaft extends through said drive shaft aperture.

7. The motor of claim 6, wherein said end cap further comprises an inner annular rim extending toward the interior of the motor dimensioned to be seated against the inner wall of said open end of said housing.

8. The motor of claim 7, further comprising an o-ring disposed about the outer periphery of said annular rim.

9. The motor of claim 1, further comprising a bush collar seated against the interior wall of said housing.

10. The motor of claim 9, wherein the drive shaft includes a circumferential groove for receiving a ring seal located along the shaft at the point where the shaft extends through said drive shaft aperture.

11. The motor of claim 10, wherein said end cap further comprises an inner annular rim extending toward the interior of the motor dimensioned to be seated against the inner wall of said open end of said housing.

12. The motor of claim 11, further comprising an o-ring disposed about the outer periphery of said annular rim.

* * * * *